US012577039B2

(12) United States Patent
Patel et al.

(10) Patent No.: US 12,577,039 B2
(45) Date of Patent: Mar. 17, 2026

(54) WASTE MANAGEMENT RECEPTACLE SYSTEM FOR CONTAINMENT OF ODOROUS WASTE AND METHOD OF USING

(71) Applicant: Iron Patents LLC, Shelton, CT (US)

(72) Inventors: Sahil Patel, North Haven, CT (US); Ashish Patel, Shelton, CT (US)

(73) Assignee: Iron Patents LLC, Shelton, CT (US)

( * ) Notice: Subject to any disclaimer, the term of this patent is extended or adjusted under 35 U.S.C. 154(b) by 381 days.

(21) Appl. No.: 17/987,318

(22) Filed: Nov. 15, 2022

(65) Prior Publication Data

US 2023/0159268 A1 May 25, 2023

Related U.S. Application Data

(60) Provisional application No. 63/281,305, filed on Nov. 19, 2021.

(51) Int. Cl.
*B65F 1/00* (2006.01)
*B65F 1/08* (2006.01)
*B65F 1/16* (2006.01)

(52) U.S. Cl.
CPC .............. *B65F 1/08* (2013.01); *B65F 1/1615* (2013.01); *B65F 1/1646* (2013.01); *B65F 2001/1676* (2013.01); *B65F 2210/167* (2013.01)

(58) Field of Classification Search
CPC ........ B65F 1/08; B65F 1/1615; B65F 1/1646; B65F 1/0053; B65F 2001/1676; B65F 2210/167; B65D 81/3216
USPC ............................................... 220/23.89, 908
See application file for complete search history.

(56) References Cited

U.S. PATENT DOCUMENTS

| | | | | | |
|---|---|---|---|---|---|
| 1,886,630 | A * | 11/1932 | Bourdette | B65F 7/00 | 220/87.1 |
| 3,378,323 | A * | 4/1968 | Goldberg | B65F 1/163 | 312/319.9 |
| 3,659,778 | A * | 5/1972 | Saultz | B65F 1/1426 | 16/374 |
| 5,097,975 | A * | 3/1992 | Waterston | B65F 1/0053 | 220/DIG. 13 |
| 5,303,841 | A | 4/1994 | Mezey | | |
| 5,392,942 | A * | 2/1995 | Hanson | B65F 1/00 | 220/826 |

(Continued)

*Primary Examiner* — Don M Anderson
*Assistant Examiner* — Elizabeth J Volz
(74) *Attorney, Agent, or Firm* — DeLio Peterson & Curcio LLC; David R. Pegnataro

(57) ABSTRACT

A waste management receptacle system for containment of odorous waste comprising a primary receptacle, comprising a base with vertically extending sidewalls forming an interior portion, a rim, and primary receptacle lid movable between an open and closed position. The system includes a secondary receptacle comprising a bottom with upstanding sidewalls forming a secondary interior, and a lid portion moveable between open and closed positions. A clamping member secures the secondary receptacle within the primary receptacle interior. The clamping member comprises a lateral member having ends with longitudinal members extending therefrom, and a fastening member disposed on a longitudinal member. The fastening member is movable between a disengaged and engaged position to secure the clamping member to the primary receptacle.

14 Claims, 16 Drawing Sheets

(56) References Cited

U.S. PATENT DOCUMENTS

| | | | | |
|---|---|---|---|---|
| 5,495,941 | A * | 3/1996 | Leonard | A61B 50/362 206/370 |
| 5,781,959 | A * | 7/1998 | Tipotsch | A47L 13/58 15/263 |
| 6,138,558 | A | 10/2000 | Harrington | |
| 6,578,730 | B2 | 6/2003 | Trunsky | |
| 7,232,136 | B2 | 6/2007 | Sheehan | |
| 8,544,673 | B1 | 10/2013 | Polk | |
| 8,844,751 | B2 | 9/2014 | Sakaguchi et al. | |
| 11,970,332 | B1 * | 4/2024 | Peng | B65F 1/0053 |
| 2006/0237461 | A1 | 10/2006 | Chomik et al. | |
| 2008/0264948 | A1 | 10/2008 | Kovacevich et al. | |

* cited by examiner

WASTE MANAGEMENT RECEPTACLE SYSTEM FOR CONTAINMENT OF ODOROUS WASTE AND METHOD OF USING

BACKGROUND OF THE INVENTION

1. Field of the Invention

The present invention relates to a waste management receptacle system for the disposal of feces and other odorous waste in connection with residential waste management.

2. Description of Related Art

Residential garbage receptacles are traditionally developed to have a single location or sump in which waste of all forms may be deposited therein. The present invention relates to the disposal of feces and other odorous waste in a residential garbage receptacle. which usually leads to outcomes including, but not limited to, bags of animal (as well as human) organic waste being squished, stuck at a receptacle bottom. This often leads to the creation of foul smells and unsanitary conditions under present disposal methods. Thus, a need exists to provide a simple solution which may be integral with current residential garbage receptacles or an auxiliary compartment thereto, and which creates a simple, effective, and sanitary way to dispose of fecal and other odorous waste which may foul garbage receptacles, creating discomfort and displeasure to a user tasked with the maintenance of the receptacle and the disposal of further residential waste.

SUMMARY OF THE INVENTION

Bearing in mind the problems and deficiencies of the prior art, it is therefore an object of the present invention to provide a waste management receptacle system with separate compartments for the containment of foul or odorous waste.

It is another object of the present invention to provide an auxiliary waste receptacle system for use with an existing waste receptacle for the containment of foul or odorous waste.

A further object of the invention is to provide a separate waste receptacle within a waste receptacle system to control particularly noxious odors within a separate compartment.

It is yet another object of the present invention to provide a removable waste receptacle system which would prevent squishing or sticking of odorous organic waste to a waste receptacle system.

Still other objects and advantages of the invention will in part be obvious and will in part be apparent from the specification.

The above and other objects, which will be apparent to those skilled in the art, are achieved in the present invention which is directed, in one aspect, to a waste management receptacle system for containment of odorous waste. The system comprises a primary receptacle comprising a base with vertically extending sidewalls forming an interior portion, a rim, and primary receptacle lid proximate said rim movable between an open position and a closed position. A secondary receptacle may be place within the primary receptacle interior. The secondary receptacle may comprise a bottom with upstanding sidewalls forming a secondary interior, a rim, and a lid portion moveable between an open position and a closed position. A clamping member may comprise a lateral member having ends with first and second longitudinal members extending therefrom. The second or first longitudinal member may be coupled to the secondary receptacle proximate the secondary receptacle rim, and a clamping channel may be formed between the longitudinal members. The clamping member may further comprise at least one fastening member disposed on the first or second longitudinal members, the at least one fastening member movable between a disengaged position and an engaged position. The clamping member may be secured to at least one of the vertically extending sidewalls of the primary receptacle upon insertion of the at least one of the vertically extending sidewalls of the primary receptacle within the clamping channel and placement of the at least one fastening member into the engaged position such that the secondary receptacle is disposed within the primary receptacle interior. A user may move the primary receptacle lid and/or the secondary receptacle lid portion to deposit waste within the primary receptacle interior portion, the secondary interior, or both.

The secondary receptacle may comprise a sloped bottom to facilitate release of waste within the primary receptacle interior portion upon inversion of the waste management receptacle system. At least one of the vertically extending sidewalls of the primary receptacle may comprise at least one stanchion member for receiving said at least one fastening member in the engaged position. The secondary receptacle may further comprise a removable receptacle liner portion for placement within the secondary interior. The removable receptacle liner portion may comprise a container base having vertically extending sidewalls forming a container interior for deposit of waste therein. The removable receptacle liner portion sidewalls may comprise a plurality of openings. The secondary receptacle sidewalls may comprise a plurality of projecting tabs receivable with the plurality of openings to form a detent mechanism. The removable receptacle liner portion may further comprise a rim having a flanged seal or gasket to facilitate sealing of the secondary interior and container interior when the secondary receptacle lid portion is in the closed position. The secondary receptacle lid portion may comprise a moveable extension portion having a closure end, wherein said extension portion closure end is disposed on an exterior of the primary receptacle when the primary receptacle lid and the secondary receptacle lid portion are in the closed position, and wherein the extension portion is in mechanical communication with the primary receptacle lid and the secondary receptacle lid portion such that responsive to movement of the extension portion, the primary receptacle lid and the secondary receptacle lid portion may be moved from the closed position to the open position. The extension portion closure end may further comprise a magnetic or mechanical latch mechanism.

In another aspect, the present invention provides an auxiliary waste receptacle for use within a waste management system for containment of odorous waste. The waste receptacle may comprise a waste receptacle housing comprising a bottom with upstanding sidewalls forming a waste receptacle interior and a rim. A clamping member may comprise a lateral member having ends with first and second longitudinal members extending therefrom. A clamping channel may be formed between the longitudinal members, and at least one fastening member may be disposed on the first or second longitudinal members. The at least one fastening member is movable between a disengaged position and an engaged position, and the second or first longitudinal member may be coupled to the waste receptacle housing proximate the rim. The waste receptacle may further comprise a lid portion moveable between an open position and a closed position, wherein odorous waste may be placed within the waste receptacle interior upon movement of the waste receptacle lid to the open position. The receptacle housing may comprise a sloped bottom. The waste receptacle may further comprise a removable receptacle liner portion for placement within the waste receptacle interior, the removable receptacle liner portion comprising a container base having vertically extending sidewalls forming a container interior for deposit of odorous waste therein. The removable receptacle liner portion sidewalls may comprise a plurality of openings and the waste receptacle housing sidewalls may comprise a plurality of projecting tabs receivable with the plurality of openings to form a detent mechanism. The removable receptacle liner portion may further comprise a rim having a flanged seal or gasket to facilitate sealing of the waste receptacle interior and container interior when the waste receptacle lid portion is in the closed position. The lid portion may further comprise a moveable extension portion in mechanical communication with the waste receptacle lid portion. The extension portion may include a closure end comprising a magnetic or mechanical latch mechanism.

In another aspect, the present invention further provides a method of using a waste management receptacle system for containment of odorous waste. The method comprises providing a waste management system comprising a primary receptacle comprising a base with vertically extending sidewalls forming an interior portion, a rim, and primary receptacle lid proximate said rim movable between an open position and a closed position. A secondary receptacle may be placed within the primary receptacle interior. The secondary receptacle comprises a bottom with upstanding sidewalls forming a secondary interior, a rim, and a lid portion moveable between an open position and a closed position. A clamping member comprises a lateral member having ends with first and second longitudinal members extending therefrom. The second or first longitudinal member may be coupled to the secondary receptacle proximate the secondary receptacle rim, and a clamping channel may be formed between the longitudinal members. The clamping member may further comprise at least one fastening member disposed on the first or second longitudinal members, the at least one fastening member movable between a disengaged position and an engaged position. The method further comprises inserting at least one of the vertically extending sidewalls of the primary receptacle within the clamping channel, and placing the at least one fastening member into the engaged position to secure the clamping member to the at least one of the vertically extending sidewalls of the primary receptacle such that said secondary receptacle is disposed within the primary receptacle interior. The method may further comprise moving said primary receptacle lid to the open position to expose the primary receptacle interior portion, moving said secondary receptacle lid portion to the open position to expose the secondary receptacle interior portion, and placing odorous waste within said secondary receptacle interior portion.

The secondary receptacle lid portion may comprise a moveable extension portion having a closure end, wherein the extension portion closure end is disposed on an exterior of the primary receptacle when the primary receptacle lid and the secondary receptacle lid portion are in the closed position, and wherein the extension portion is in mechanical communication with the primary receptacle lid and the secondary receptacle lid portion. The method may further comprise moving the extension portion such that the steps of moving the primary receptacle lid and moving the secondary receptacle lid occur simultaneously.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE EMBODIMENT(S)

Figure 1:
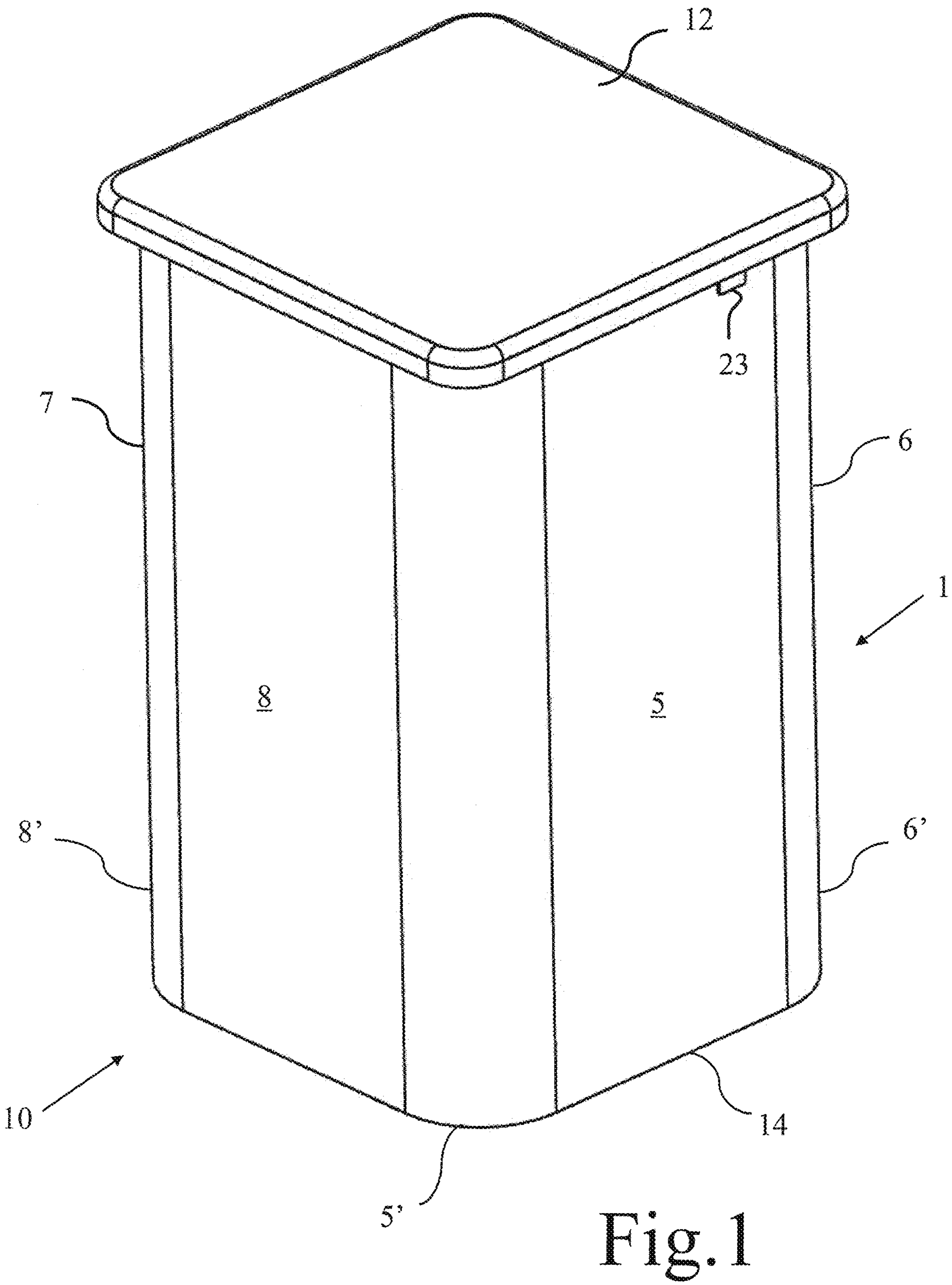
FIG. 1 is a perspective view of the waste management system according to an embodiment of the present invention.

In describing the embodiments of the present invention, reference will be made herein to FIGS. 1-16 of the drawings in which like numerals refer to like features of the invention.

While the one or more embodiments of the invention are illustrated with respect to certain features of waste management systems, it should be understood that any of the embodiments and/or features thereof illustrated with respect to one embodiment may be utilized with any of the other embodiments and/or features thereof. Similarly, while the present invention is directed to a waste management receptacle system in residential waste applications, different modalities and applications for the removal of foul and unsightly waste are not meant to be precluded, and the present invention is meant to embrace such alternatives.

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the singular forms "a", "an" and "the" are intended to include the plural forms as well, unless the context clearly indicates otherwise. Also, as used herein, the term "and/or" includes any and all combinations of one or more of the associated listed items. It will be further understood that the terms "include" and/or "including" when used herein, specify the presence of stated features, steps, operations, elements, and/or components, but do not preclude the presence or addition of one or more other features, steps, operations, elements, components, and/or groups thereof.

It will be understood that when an element is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected", "coupled", "operatively coupled", or the like to another element, it can be directly connected, coupled, or operatively coupled to the other element or intervening elements may be present. Moreover, it can be removable or integral with the other element and/or intervening elements. In contrast, when an element is referred to as being "directly connected", "directly coupled", or "directly operatively coupled" to another element, there are no intervening elements present.

Relative terms such as "below," "above," "upper," "lower," "horizontal," "vertical," "top," "bottom," "rear," "front," "side," or the like may be used herein to describe a relationship of one element or component to another element or component as illustrated in the figures. It will be understood that these terms are intended to encompass different orientations of the device in addition to the orientation depicted in the figures.

Additionally, in the subject description, the words "exemplary," "illustrative," or the like are used to mean serving as an example, instance or illustration. Any aspect or design described herein as "exemplary" or "illustrative" is not necessarily intended to be construed as preferred or advantageous over other aspects or design. Rather, use of the words "exemplary" or "illustrative" is merely intended to present concepts in a concrete fashion.

Figure 2:
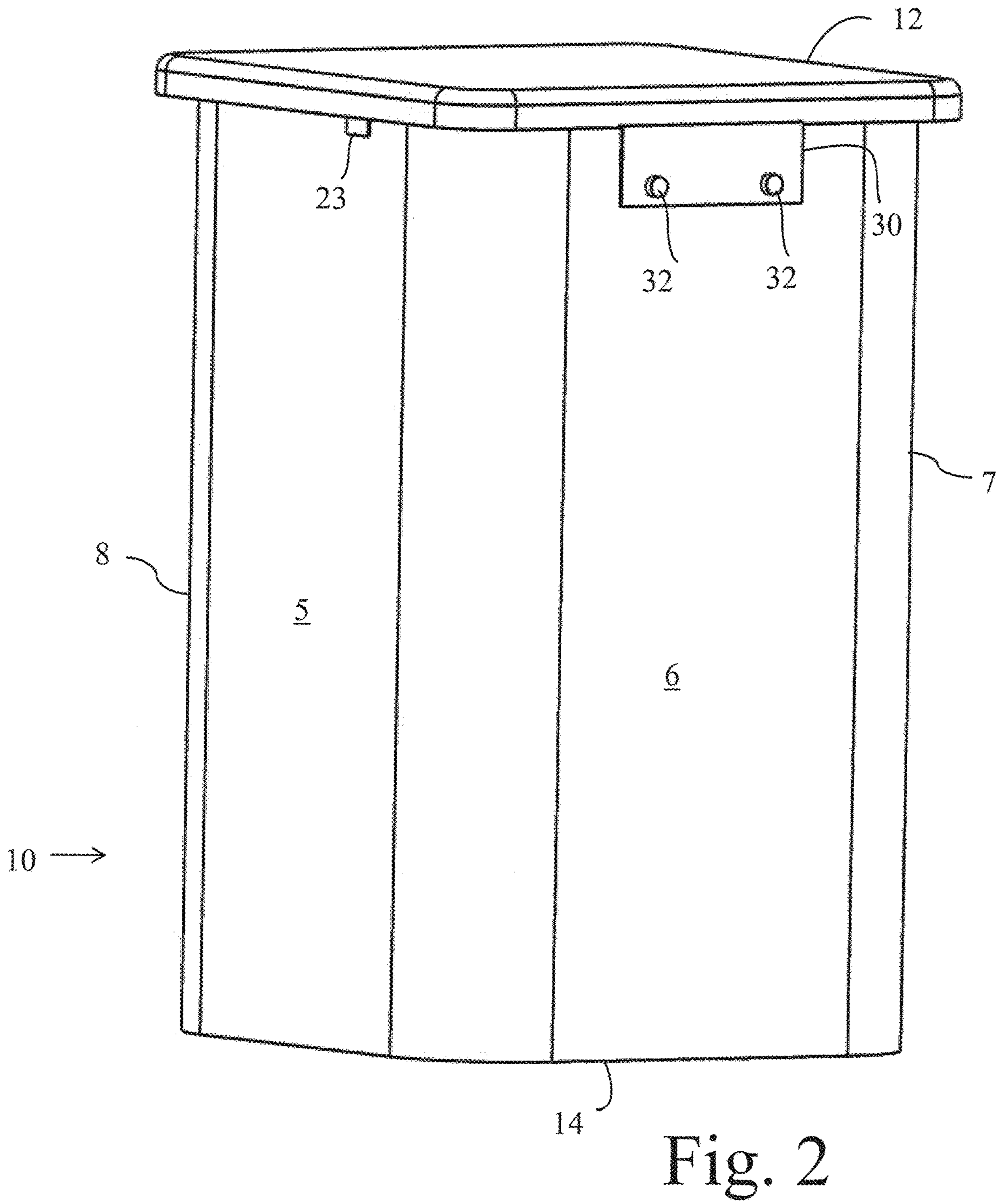
FIG. 2 is a side perspective view of the waste management receptacle system of FIG. 1, depicting the attachment of the clamping member to the primary receptacle.
Figure 3:
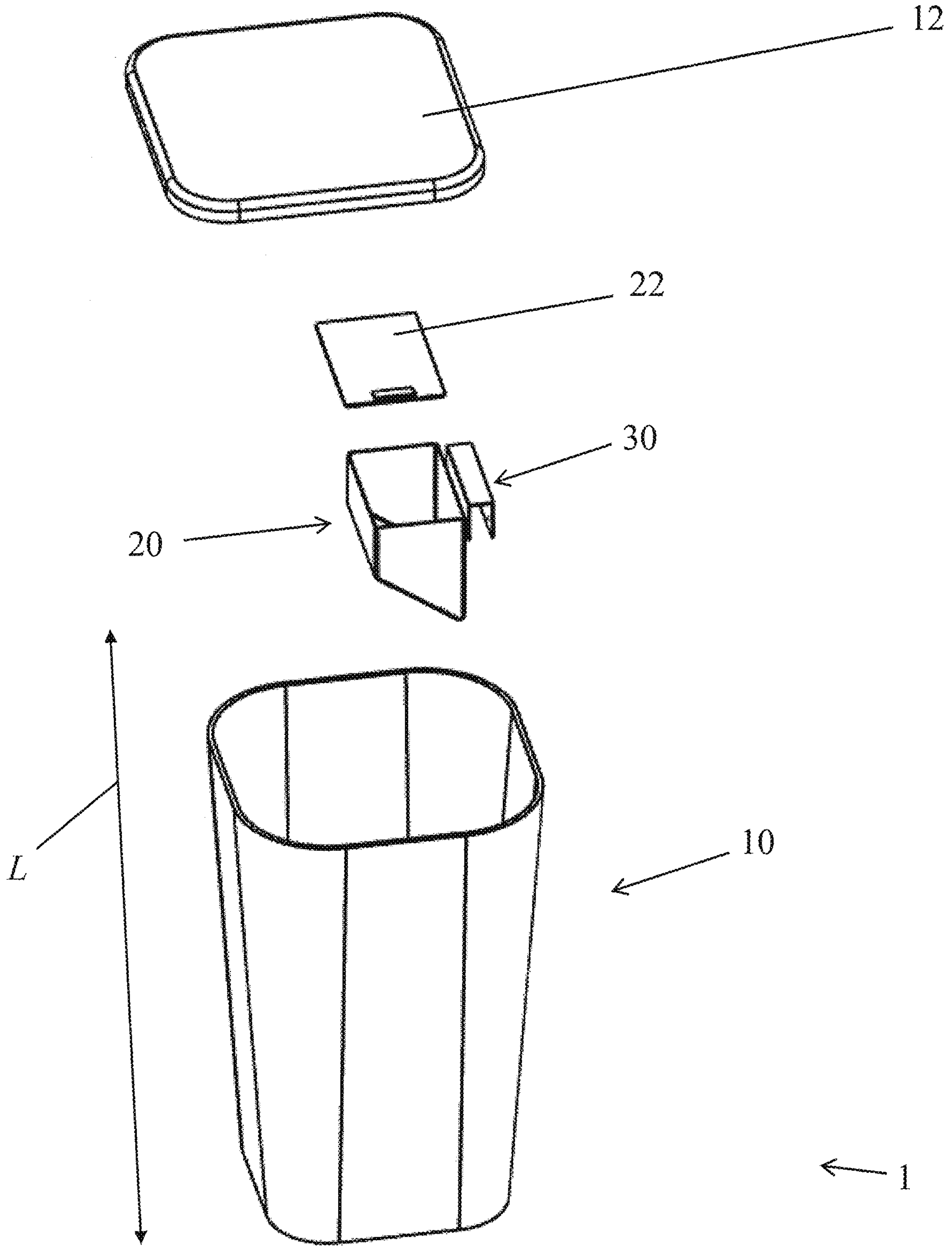
FIG. 3 is an exploded view of the waste management receptacle system of FIG. 1.
Figure 4:
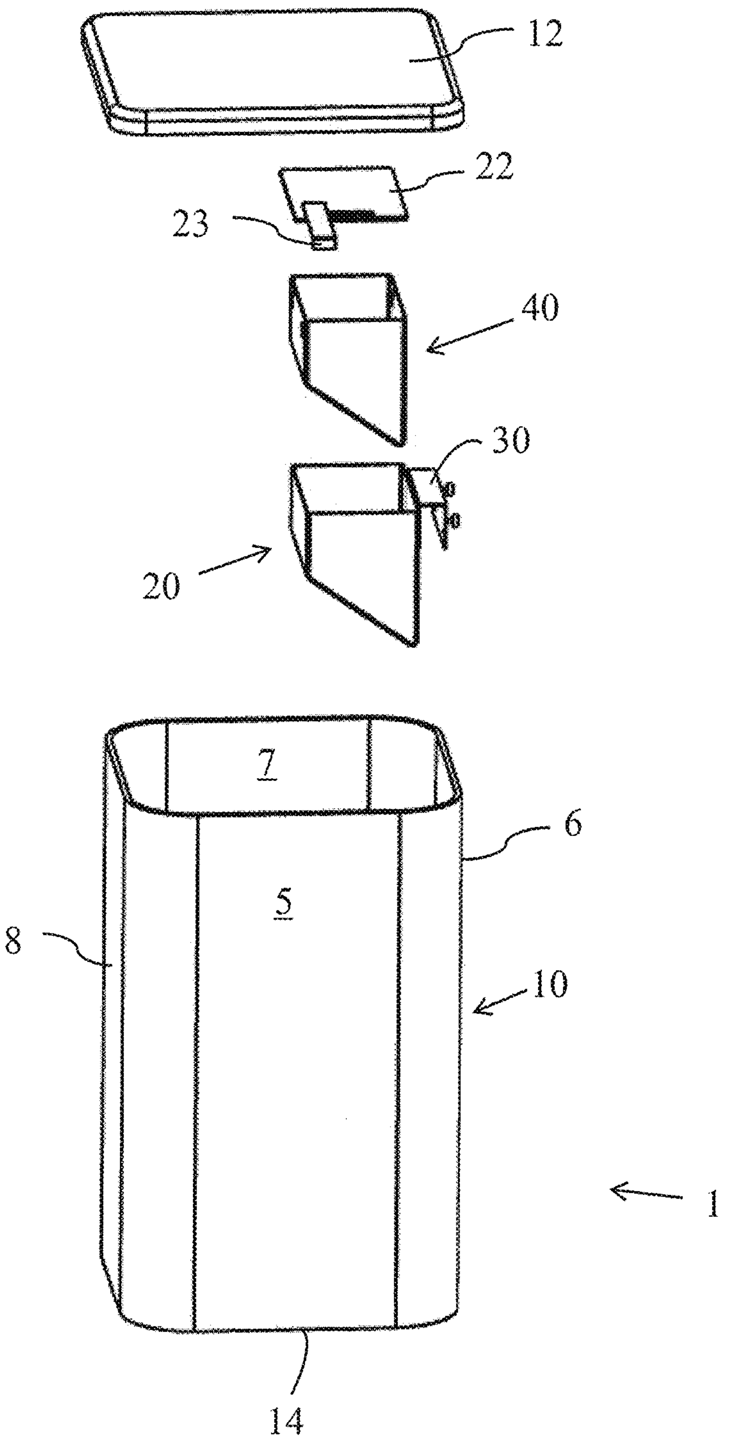
FIG. 4 is an exploded view of an embodiment of the waste management receptacle system of the present invention, including a removable receptacle liner portion.

As shown in the embodiments depicted in FIGS. 1-3, the waste management receptacle system 1 of the present invention generally includes a first receptacle 10 comprising a base 14, sidewalls 5, 6, 7, 8 extending vertically therefrom forming an open-topped structure having an interior portion 15. A lid 12, which may be of a similar size and configuration to base 14, encapsulates interior portion 15, and may be removable from the primary receptacle or of a hinged configuration such that a pivot point is formed relative to rim 18 of a sidewall 5, 6, 7, 8 for opening and closing the primary receptacle. Within interior portion 15, a secondary receptacle 20 is disposed, and may be integral with the one or more sidewalls 5, 6, 7, 8 forming interior portion 15. In the alternative, secondary receptacle 20 may comprise a clamping member 30, which may be of a U-shaped configuration as depicted, though other similar configurations are not meant to be precluded. While the secondary receptacle 20 depicted in FIG. 3 comprises a sloped bottom configuration, it should be understood by those skilled in the art that other geometric configurations of the secondary receptacle bottom, including those having a substantially flat or contoured construction, are not meant to be precluded, and the present invention should be considered to embrace any geometric configuration which would be suitable to contain particularly odorous waste within an interior receptacle portion. The sloped bottom 24 of the secondary receptacle 20 advantageously facilitates the release of refuse placed within the primary receptacle 10 after inversion during waste management removal operations. Upstanding sidewalls 26*a*-*c* are integral with sloped bottom 24, with sidewall 26*a* extending along longitudinal axis L a distance less than sidewall 26*b*, resulting in the acute angle of sloped bottom 24. Sidewalls 26*c* extend from bottom 24, forming the open-topped secondary receptacle 20. Secured to rim 28 of the secondary receptacle, preferably via a hinge secured to a sidewall 26*a*-*c*, is lid portion 22. Lid portion 22 may rotate, translate, or otherwise move between open and closed positions to allow placement of excrement, feces, or other waste within secondary interior 25. Advantageously, placement of such particularly foul materials within secondary interior 25 prevents fouling of primary receptacle 10 responsive to compression forces applied by additional waste within the interior of primary receptacle 10.

Primary receptacle 10 and/or secondary receptacle 20 may be constructed of a polymer, fiberglass, or some other material which would provide sufficient durability and flexibility to the receptacles while also achieving a light-weight construction. In some embodiments, primary receptacle 10 may comprise a handle 13 on an upper sidewall surface and wheels on a lower sidewall surface to facilitate transport of the waste management receptacle system 1.

Figure 16:
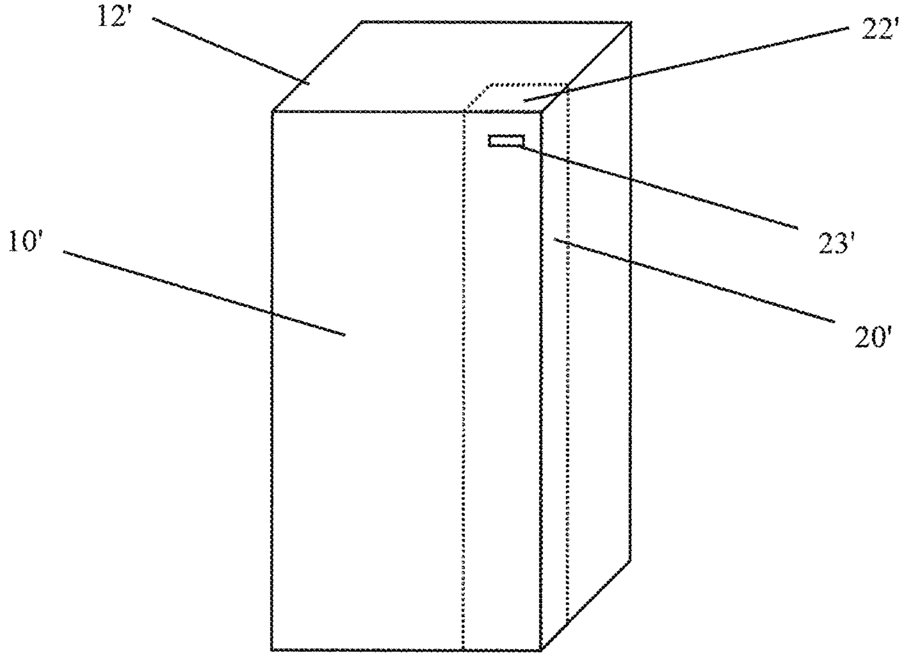
FIG. 16 is a perspective view of the waste management system according to an embodiment of the present invention, depicting the secondary receptacle and lid in phantom lines.

While the secondary receptacle of the embodiments depicted herein is disposed within only a portion of the primary receptacle, in some embodiments, upstanding sidewalls 26 of the secondary receptacle may extend such that the secondary receptacle would have a dimensional height similar to that of the primary receptacle interior portion 15 (See FIG. 16).

Clamping member 30 may be directly coupled to the secondary receptacle 20, preferably via the upper region of sidewall 26*b*, such that lateral member 30*c* of clamping member is adjacent secondary receptacle rim 28. Longitudinal members 30*a*, 30*b* extend perpendicularly from ends of the lateral member 30*c*, forming a U-shaped connecting member which may be received by one or more sidewalls 5, 6, 7, 8 of the primary receptacle 10 via the clamping channel 39. To further facilitate the attachment of the clamping member to the primary receptacle, the interior portions of the longitudinal member and/or lateral members forming clamping channel 39 may comprise a textured silicone, rubber, or other material to provide additional grip to facilitate the connection between clamping member 30 and the primary receptacle 10. After being received on the sidewall 5, 6, 7, 8, longitudinal member 30*b* is located on the interior portion 15 of the sidewall, with longitudinal member 30*a* disposed on the exterior surface of sidewall 5, 6, 7, 8. In other embodiments, as described in more detail below and shown in FIGS. 10-11, clamping member 30 may be oriented such that longitudinal members 30*a*, 30*b* are reversed and secondary receptacle 20 may be attached to the exterior of the primary receptacle 10 rather than the interior. Clamping member 30 may be constructed of fiberglass, polymers, metals, or metallic alloys including steel, aluminum alloys, or combinations thereof.

Clamping member 30 may be secured to the primary receptacle 10 through at least one fastening member 32, which may be a threaded screw, locking pin, or other similar fastening device. Optionally, the sidewall 5, 6, 7, 8 may comprise one or more openings 19 in order to secure fastening member 32 therein. Responsive to rotation, translation, or other movement of the fastening member(s) 32, the fastening member 32 will move from a disengaged position where the fastening member(s) are located on the outer portion of the clamping member 30, to an engaged position such that the fastener member is located on the interior portion of the clamping member, i.e., between longitudinal members 30*a* and 30*b*. While fastening members are in the disengaged position and after clamping member 30 has been received by a primary receptacle sidewall, the fastening member 32 may be moved to the engaged position, wherein a clamping force may be applied, securing the clamping member 30 to the primary receptacle sidewall. While clamping member 30 is depicted in FIGS. 2-5 as securing the secondary receptacle to a single sidewall of the primary receptacle, the present invention is not meant to be so limited, and other attachment configurations are not meant to be precluded. In some embodiments, like those depicted in the exemplary views of FIGS. 14 and 15, the secondary receptacle can be seen adjacent multiple sidewalls of the primary receptacle, and additionally may include a plurality of clamping members for securing the secondary receptacle to the primary receptacle. Further, while contact force is described to secure the clamping member to the primary receptacle, other modalities of security are not meant to be precluded, such as the use of applying magnetic field forces such as a magnetic attraction, repulsion and/or or shear force between the clamping member and the primary receptacle. In one or more embodiments, clamping member(s) 30 may be secured to the primary receptacle by way of adhesive, plastic welding, or any other material which would be known in the art to provide a chemical fastening between the clamping member and the primary receptacle.

In one or more embodiments, the secondary receptacle may be integrally formed or otherwise non-removably secured with the primary receptacle, thereby eliminating the need to secure the secondary receptacle to the primary receptacle via clamping member 30, like the embodiment depicted in FIG. 16. In such embodiments, the secondary receptacle and primary receptacle may be injection molded simultaneously, or heat welded, spin welded, adhered, or otherwise like means to attach secondary receptacle 20' to the interior of the primary receptacle 10'. In such embodiments, the primary lid 12' may include a lid cutout portion 22' secured to the secondary receptacle 20' via a hinge member such that access to the secondary receptacle 20' may be separate to the primary receptacle 10'. In some embodiments, lid cutout portion 22' may include a spring-loaded hinge such that use of access latch mechanism 23' on the exterior of the primary receptacle 10' will affect movement of the lid cutout portion 22', primary lid portion 12', or both, from the closed position to the open position, such that an end user can access the interior of the primary and/or secondary receptacles.

In one or more embodiments, the primary receptacle 10 may further comprise one or more stanchion members 33 on sidewall 5, 6, 7, 8 to provide further support or structure to the primary receptacle 10, preventing collapse of sidewall 5, 6, 7, 8 in situations where fastening member 32 in the engaged position would cause flexing of longitudinal members 30*a*, 30*b* towards one another, and may further prevent damage to the sidewalls of the primary receptacle. Optionally, the primary receptacle 10 may include a peripheral flange extension 18', which would provide strength to the primary receptacle 10, as well as a stop surface to the fastening member upon inversion of the waste management receptacle system 1. Advantageously, movement of clamping member 30 would be prevented upon inversion of the waste management receptacle system in the case that the clamping force applied by the fastening member 32 fails.

During use of the waste management receptacle system 1, a user with particularly odorous or foul waste (such as fecal waste) to dispose can lift lid 12, exposing the interior portion 15 of the primary receptacle 10, as well as secondary receptacle 20, which is encapsulated by secondary lid 22. The user may then move secondary lid 22 to the open position, allowing access to the secondary interior 25. The user may then place the odorous or foul waste within the secondary interior 25 and subsequently close either secondary lid 22, primary lid 12, or both. Thus, the waste management receptacle system of the present invention allows a user to isolate particularly foul, odorous waste separate from other refuse which can be placed within a primary receptacle. When a user with further refuse uses the waste management receptacle system 1, the user may lift primary lid 12, thereby exposing interior portion 15, and place refuse within the interior portion 15 without opening secondary lid 22. In this manner, particularly foul waste will continue to be isolated, and the user will not be subject to foul odors or smells while using the waste management receptacle system of the present invention.

Figure 5:
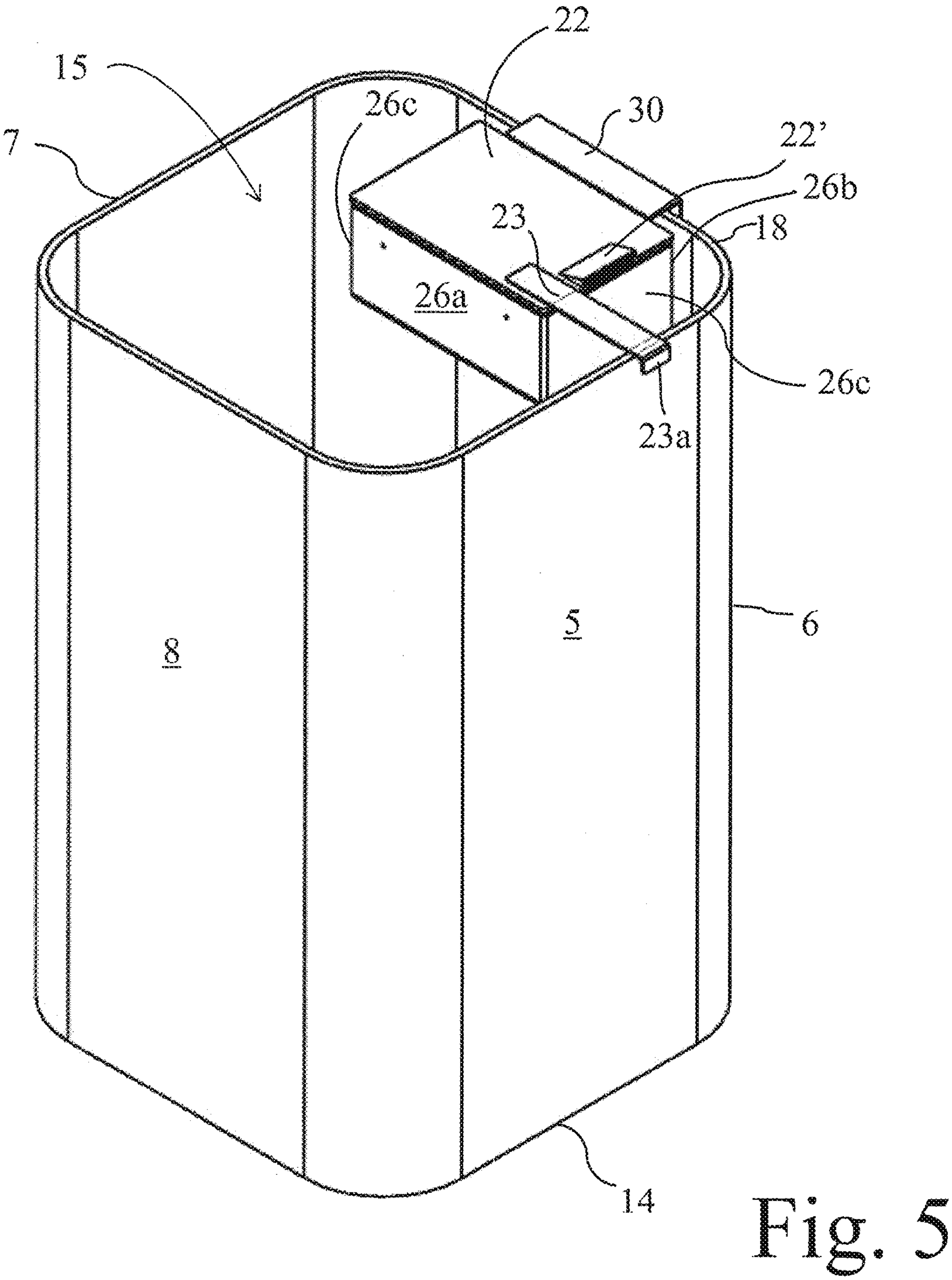
FIG. 5 is a side perspective view of the waste management receptacle system of FIG. 4, with primary receptacle lid removed.
Figure 6:
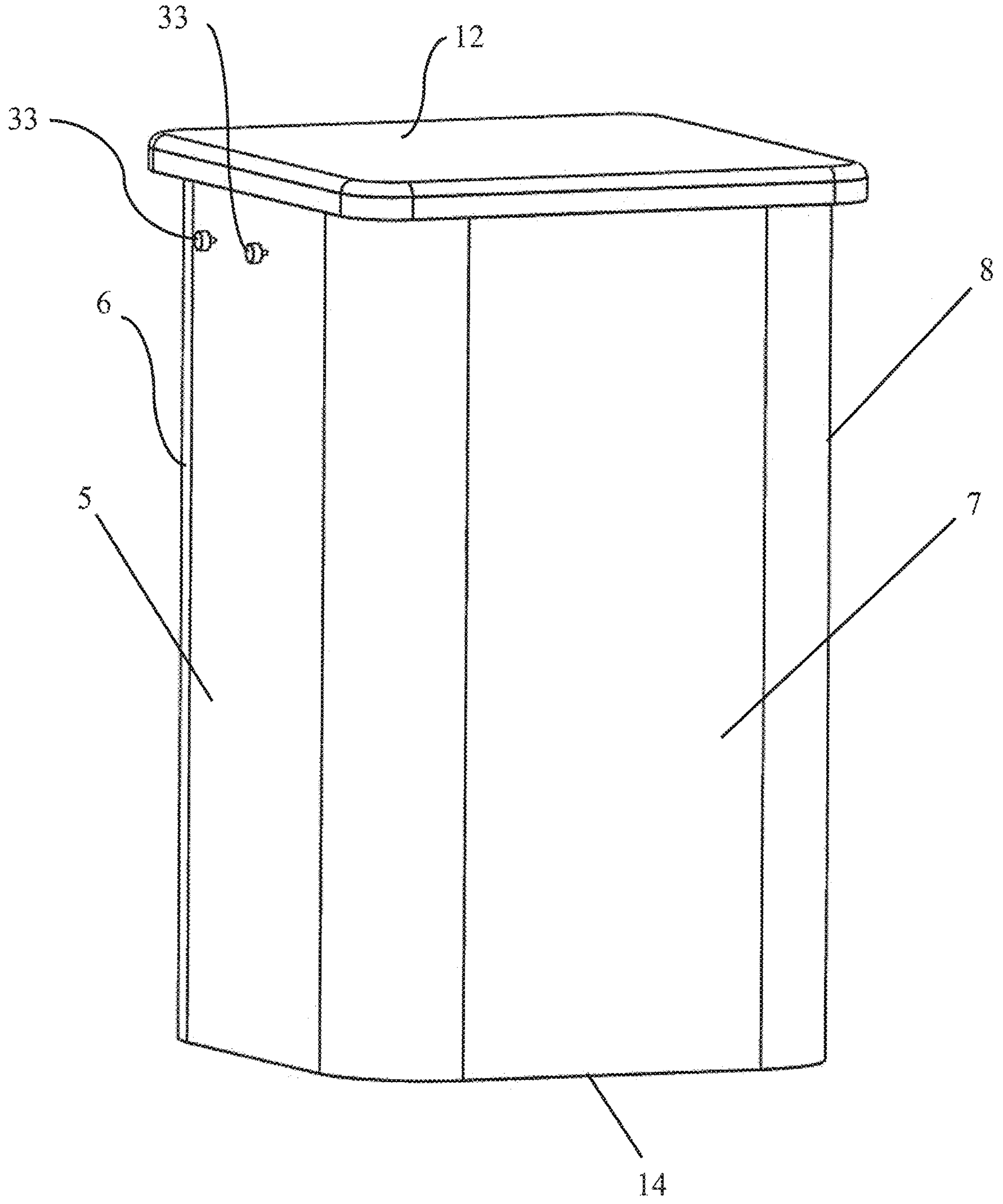
FIG. 6 is a side perspective view of the primary receptacle according to an embodiment of the present invention.
Figure 7:
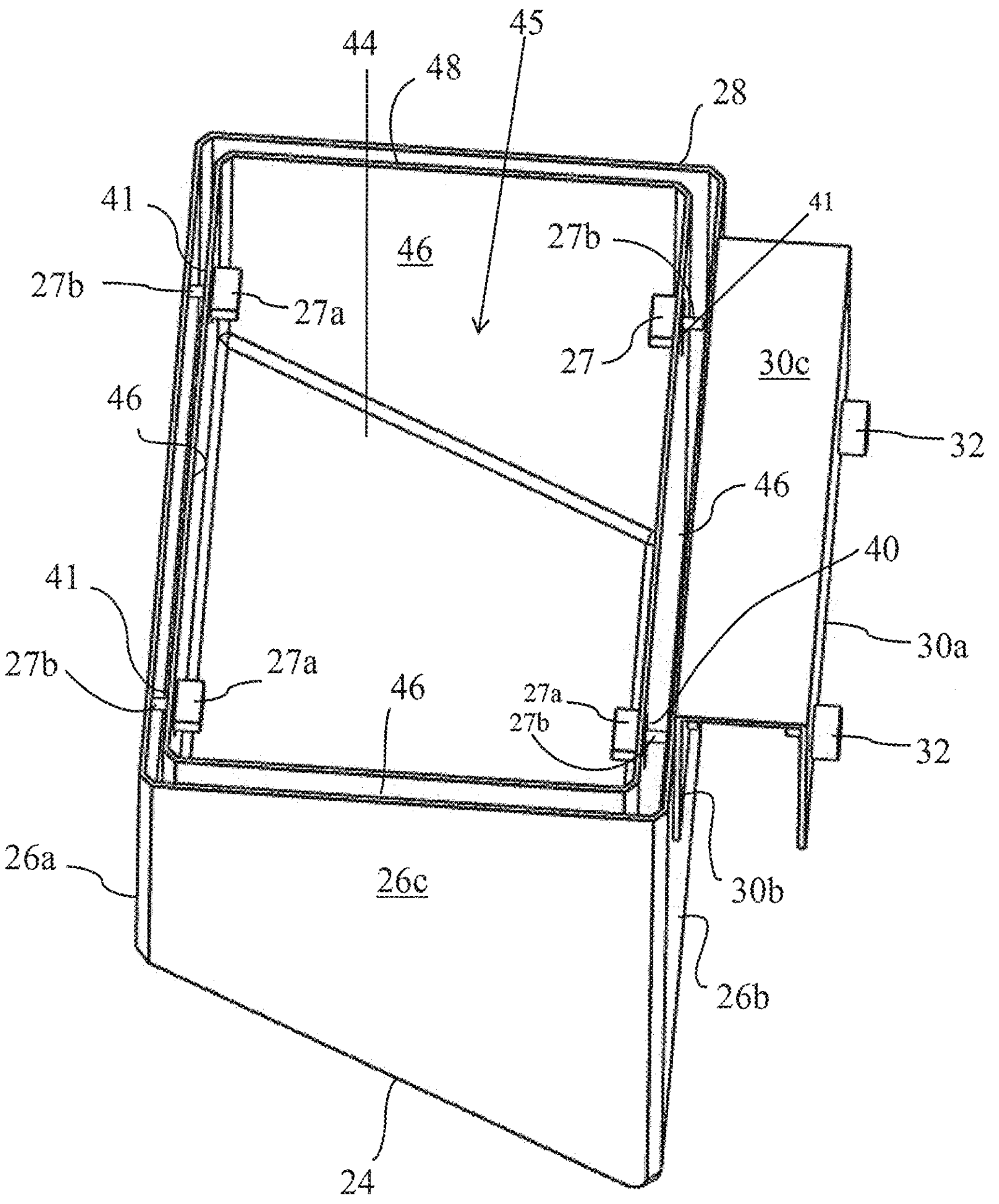
FIG. 7 is a top perspective view of the secondary receptacle and removable liner portion according to an embodiment of the present invention.
Figure 8:
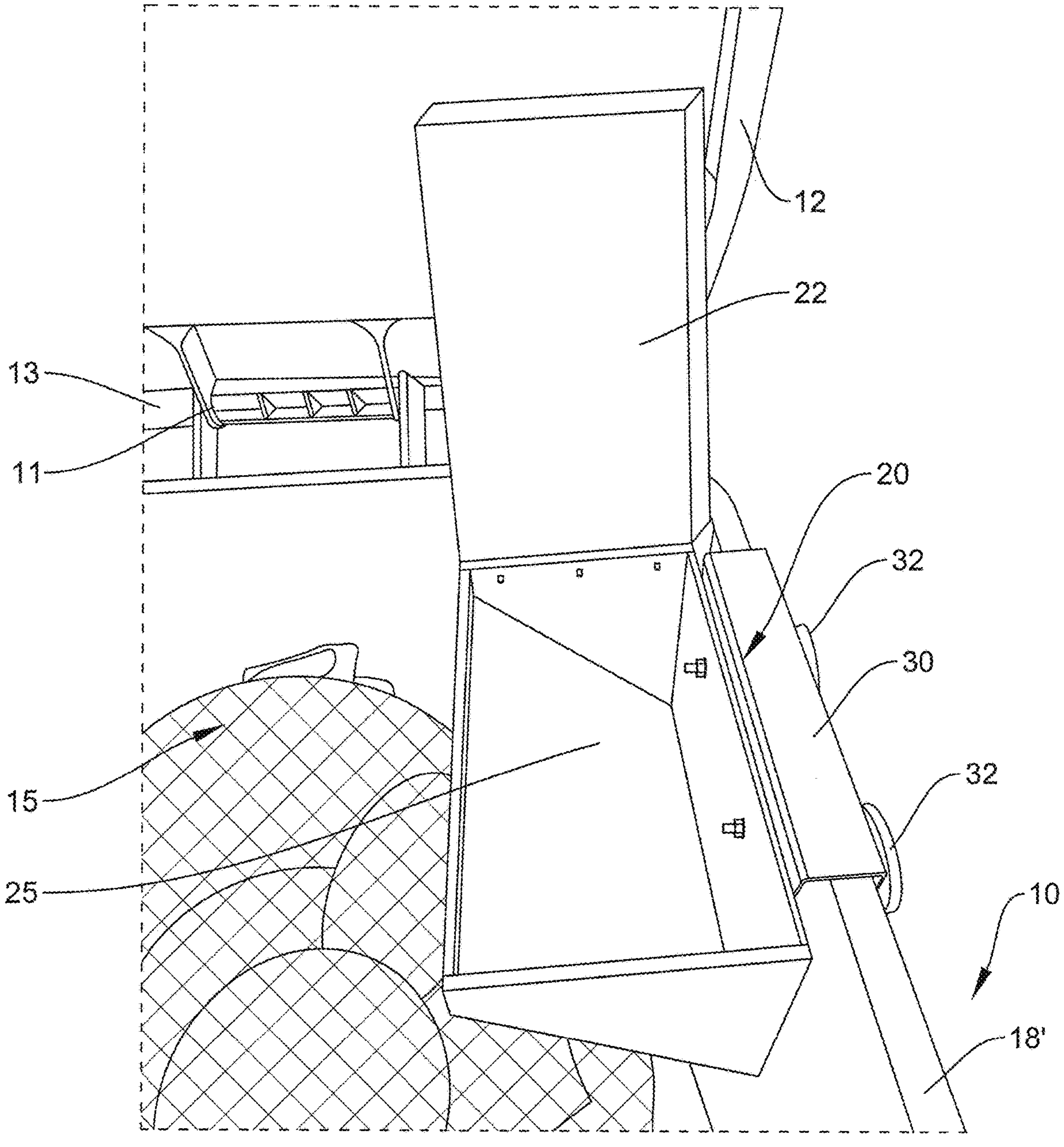
FIG. 8 is an enlarged perspective view of an embodiment of the waste management system of the present invention, during use.
Figure 9:
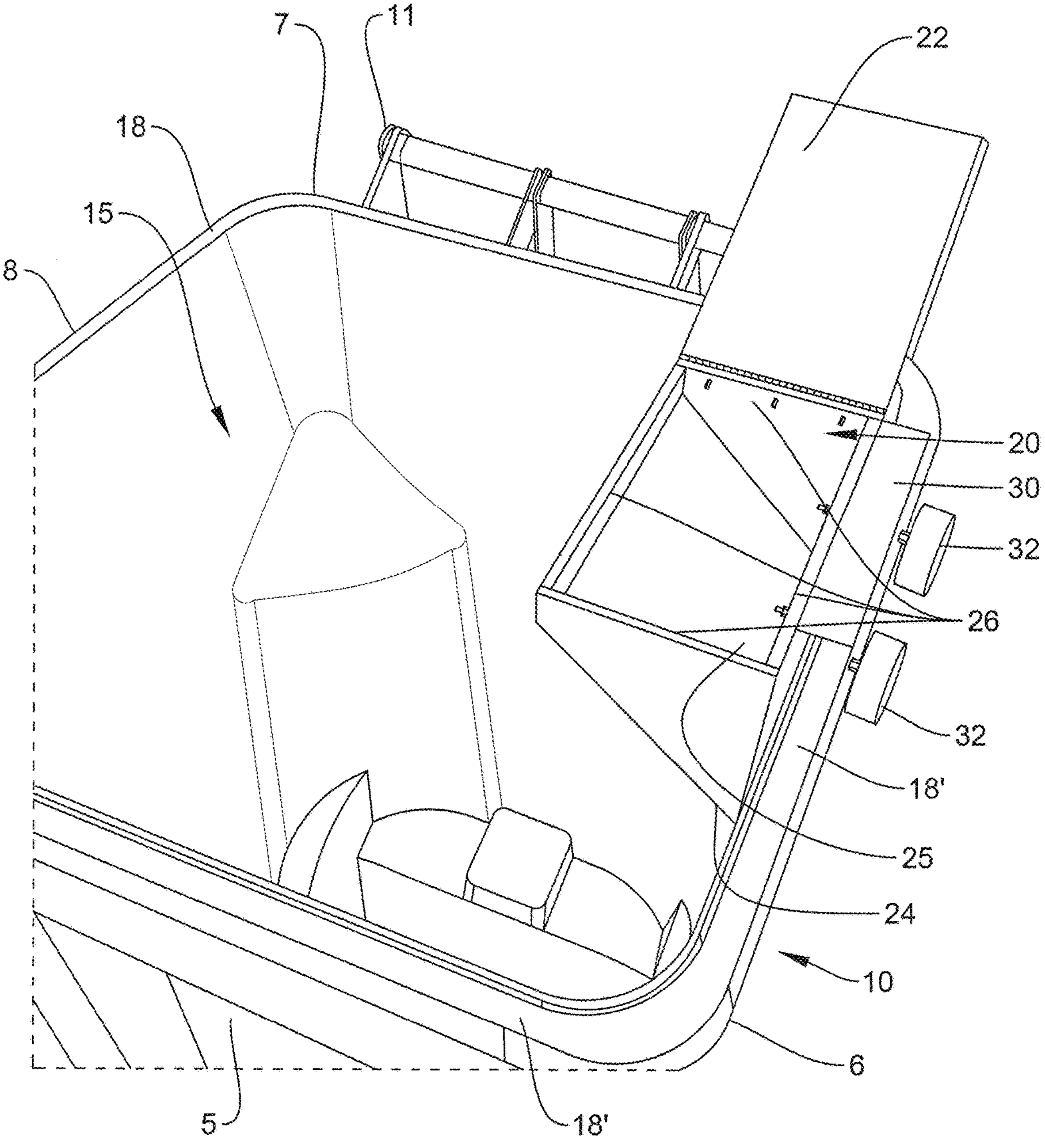
FIG. 9 is a perspective view of the waste management system of FIG. 8, after a waste management program has removed waste therefrom.

In some embodiments, like those depicted in FIG. 5, the secondary receptacle lid may comprise a handle portion 22' to facilitate lifting of the lid. The secondary receptacle lid may also comprise an extension portion 23, which may be a flexible canvas or nylon strap, and may include a closure end portion 23*a*, which may be a magnetic latch mechanism, mechanical latch mechanism, or other detent mechanism in communication with the exterior portion of the primary receptacle sidewall 5, 6, 7, 8 opposite the sidewall portion of the primary receptacle which incorporates hinge 11. When the primary and secondary receptacle lids are in the closed position, closure end portion 23*a* may be accessible to an end user, and due to contact between extension portion 23 and the primary receptacle lid 12, mechanical communication between primary receptacle lid 12, extension portion 23, and secondary receptacle lid 22 is achieved. Upon release of the detent mechanism formed between the closure end portion 23*a* and the exterior of the sidewall 5, 6, 7, 8, the end user may lift the closure end portion to access the interior of the waste management receptacle system. Thus, an end user lifting the extension portion 23 may open both primary lid 12 and secondary lids 22 simultaneously, thereby providing access to the secondary receptacle interior 25, and primary receptacle interior 15 for placement of waste within any portion selected by the end user.

Figure 10:
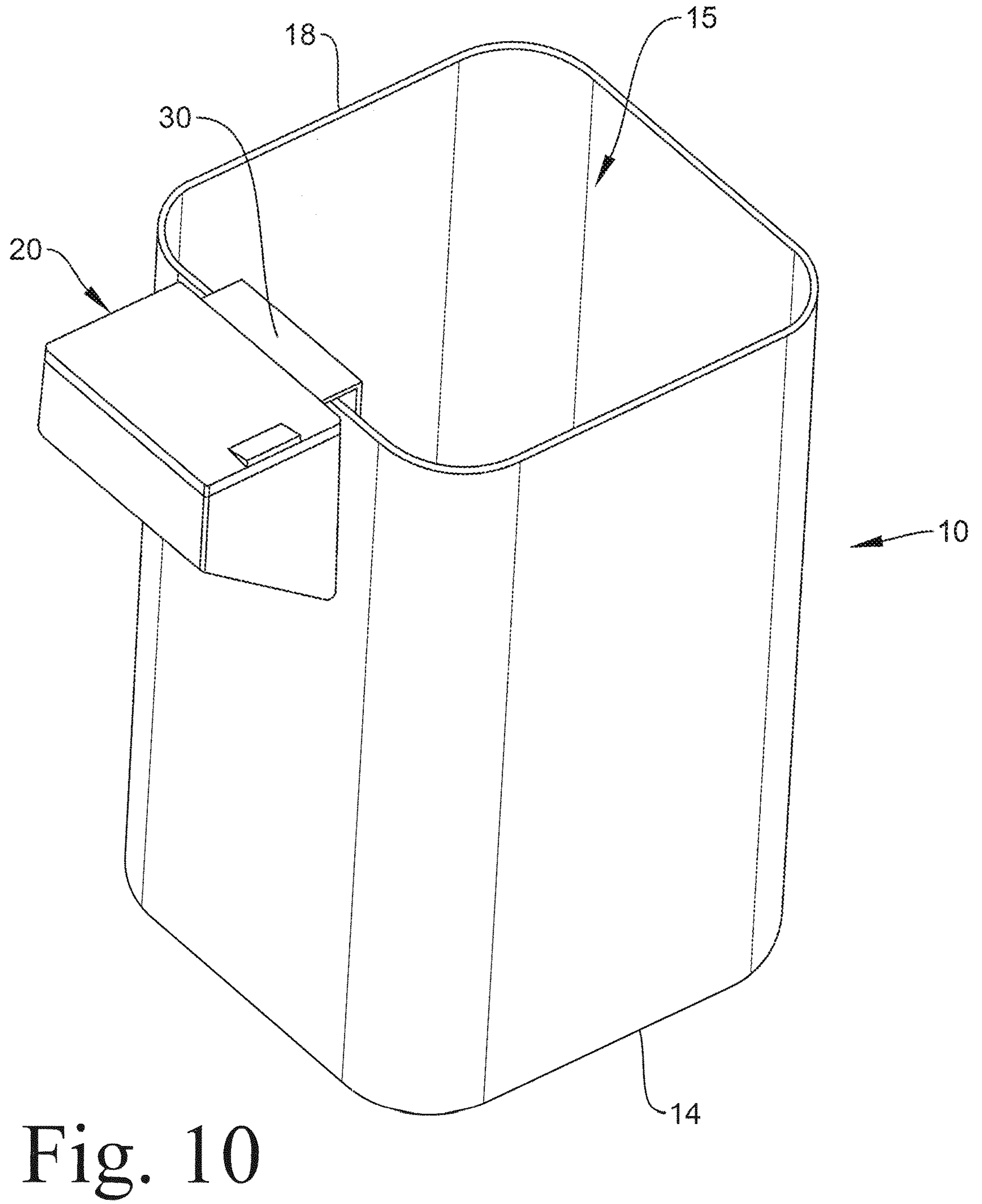
FIG. 10 is a perspective view of an embodiment of the waste management system according to the present invention, with primary receptacle lid removed.
Figure 11:
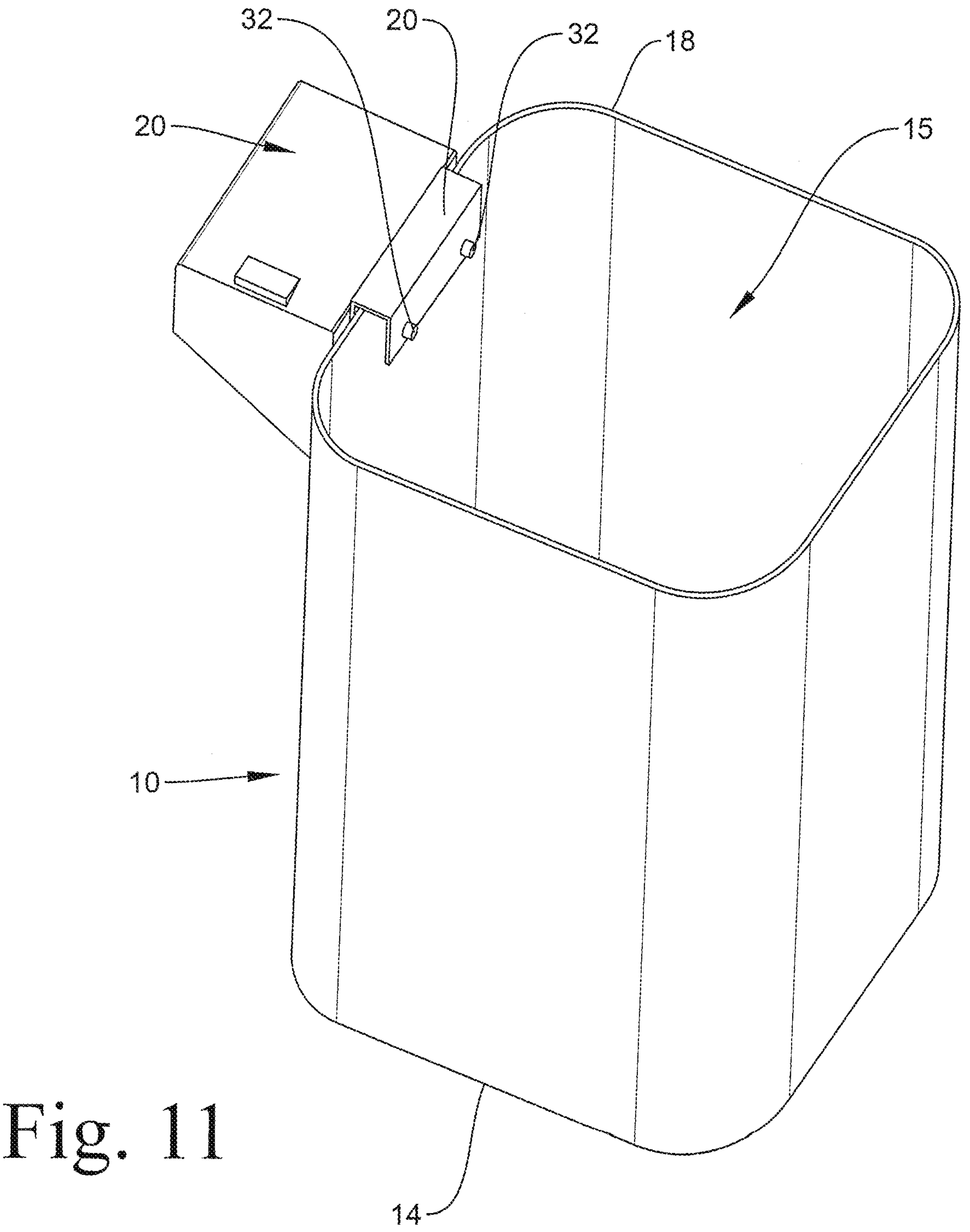
FIG. 11 is a top perspective view of the waste management system of FIG. 10.
Figure 12:
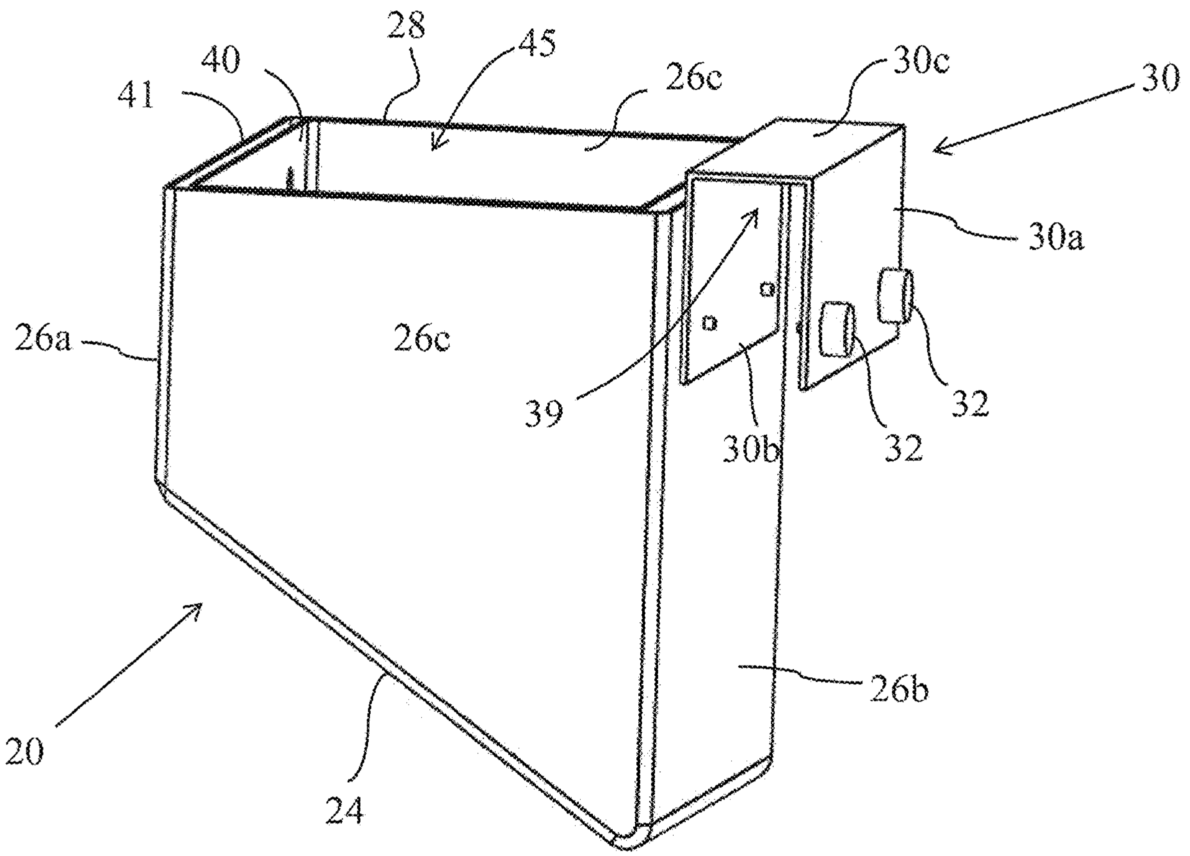
FIG. 12 is a side perspective view of the secondary receptacle and lining system according to an embodiment of the present invention, with secondary receptacle lid portion removed.
Figure 13:
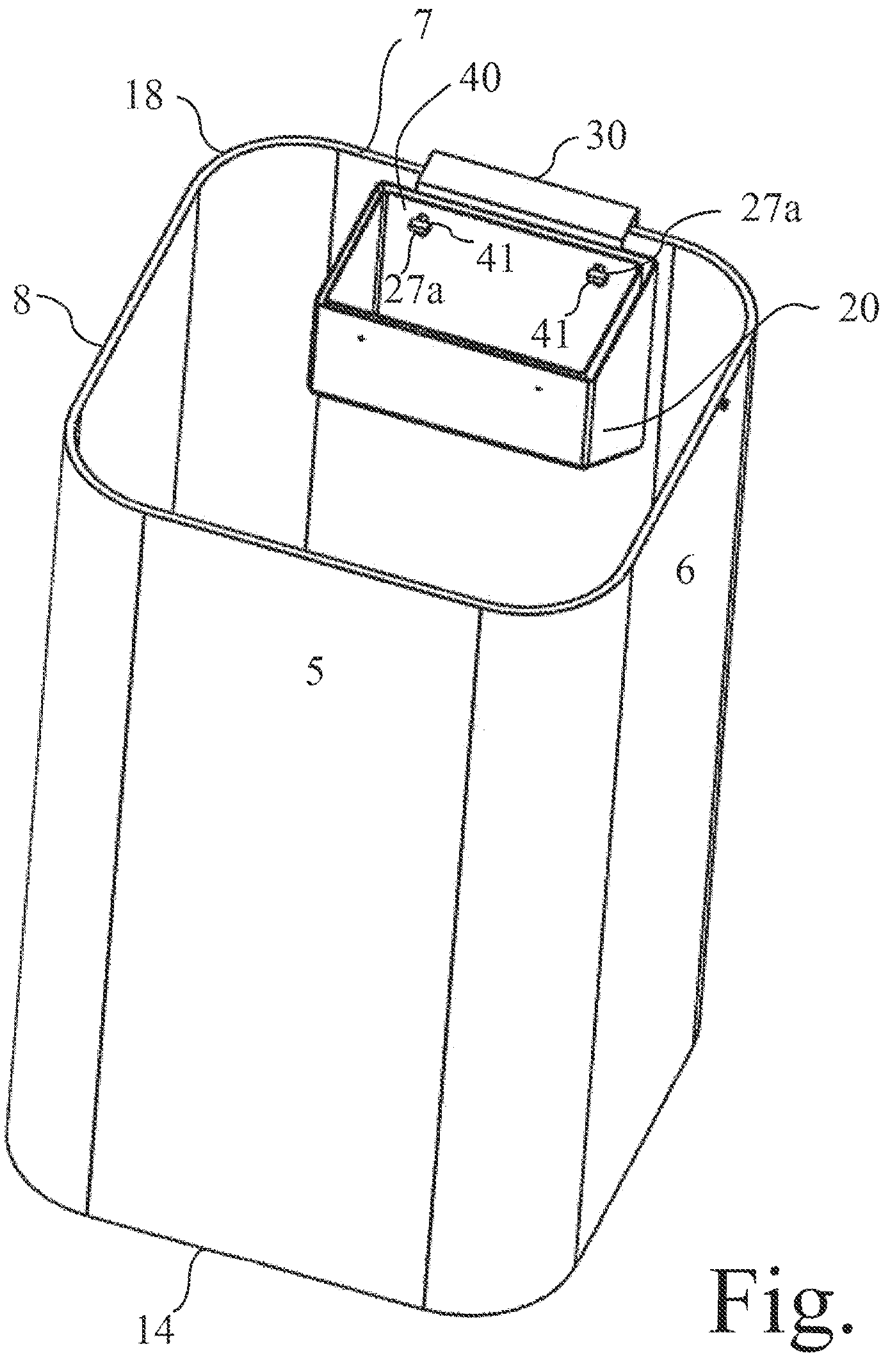
FIG. 13 is a perspective view of the secondary receptacle and lining system of FIG. 12 once placed within a primary receptacle, with primary receptacle lid and secondary receptacle lid portion removed.

Turning now to the embodiments depicted in FIGS. 10 and 11, secondary receptacle 20 may instead be attached to the exterior of the primary receptacle. In such a configuration, the clamping member is placed on the interior portion 15 of the primary receptacle 10. Such embodiments are similar in function as other embodiments described herein, but advantageously do not require the user to remove the primary receptacle lid 12 to access the interior portion 25 of the secondary receptacle 20 for placement of foul or odorous waste therein.

During collection of the waste management system of the present invention, a waste collection service may dispose of the waste within the waste management system 1 by inverting the primary receptacle 10 (after removal of lid 12 for receptacles which are not hinged) and allowing gravitational forces to cause waste to be freed from the interior portion 15 of the primary receptacle, while secondary lid 22 may simultaneously be moved to an open position, thereby exposing secondary interior 25, allowing the odorous or foul waste to be subsequently fall via gravitational forces from the secondary interior 25. After returning the waste management system 1 to a right-side-up position, a user may subsequently return primary and secondary lids 12, 22 to the waste management system 1. Advantageously, the closure of primary lid 12 to secure the primary receptacle will cause secondary lid 22 to subsequently close and secure the secondary receptacle, thereby providing a timesaving benefit to the end user.

Figure 14:
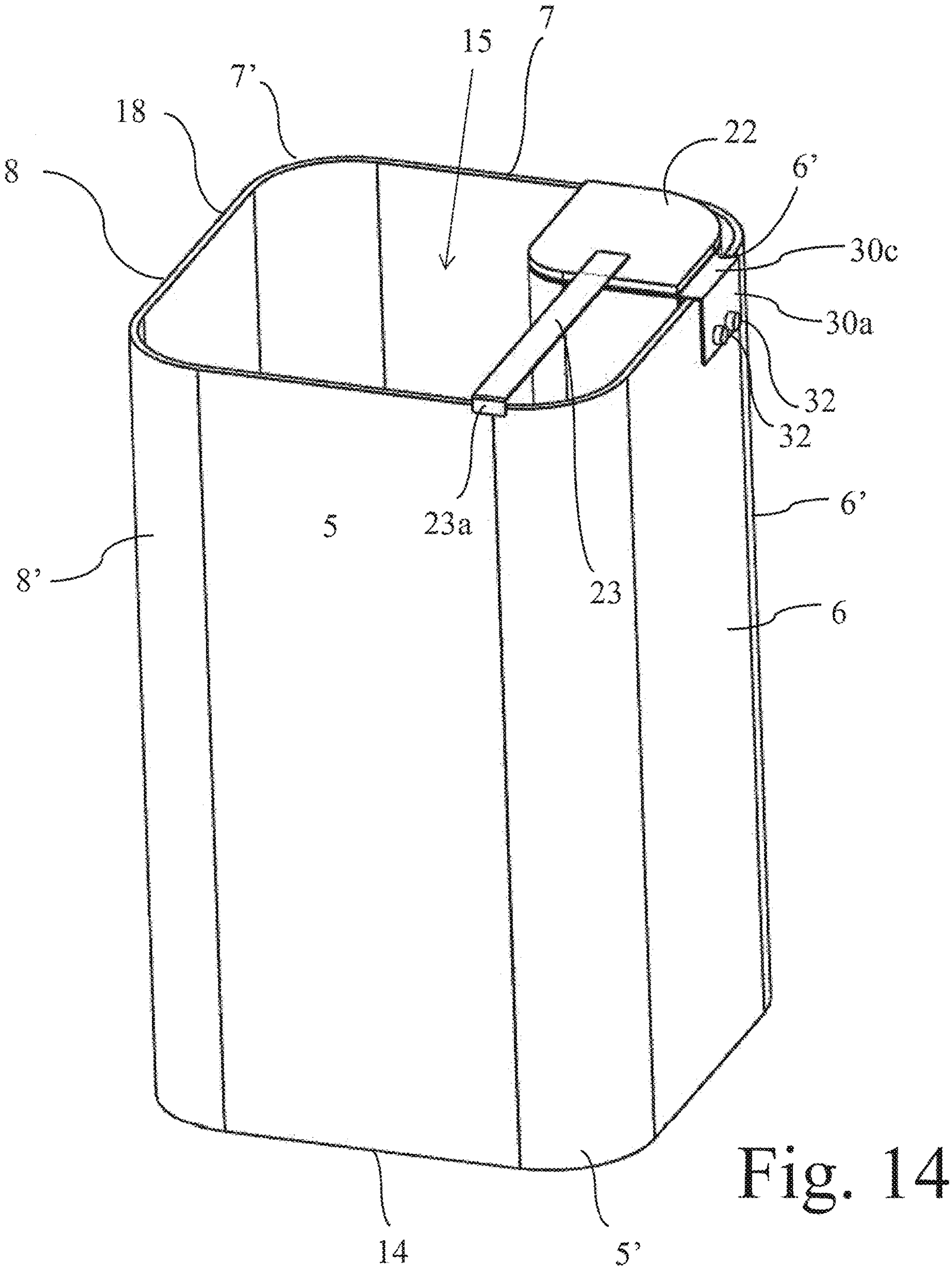
FIG. 14 is a perspective view of a waste management system according to an embodiment of the present invention, with primary receptacle lid removed.
Figure 15:
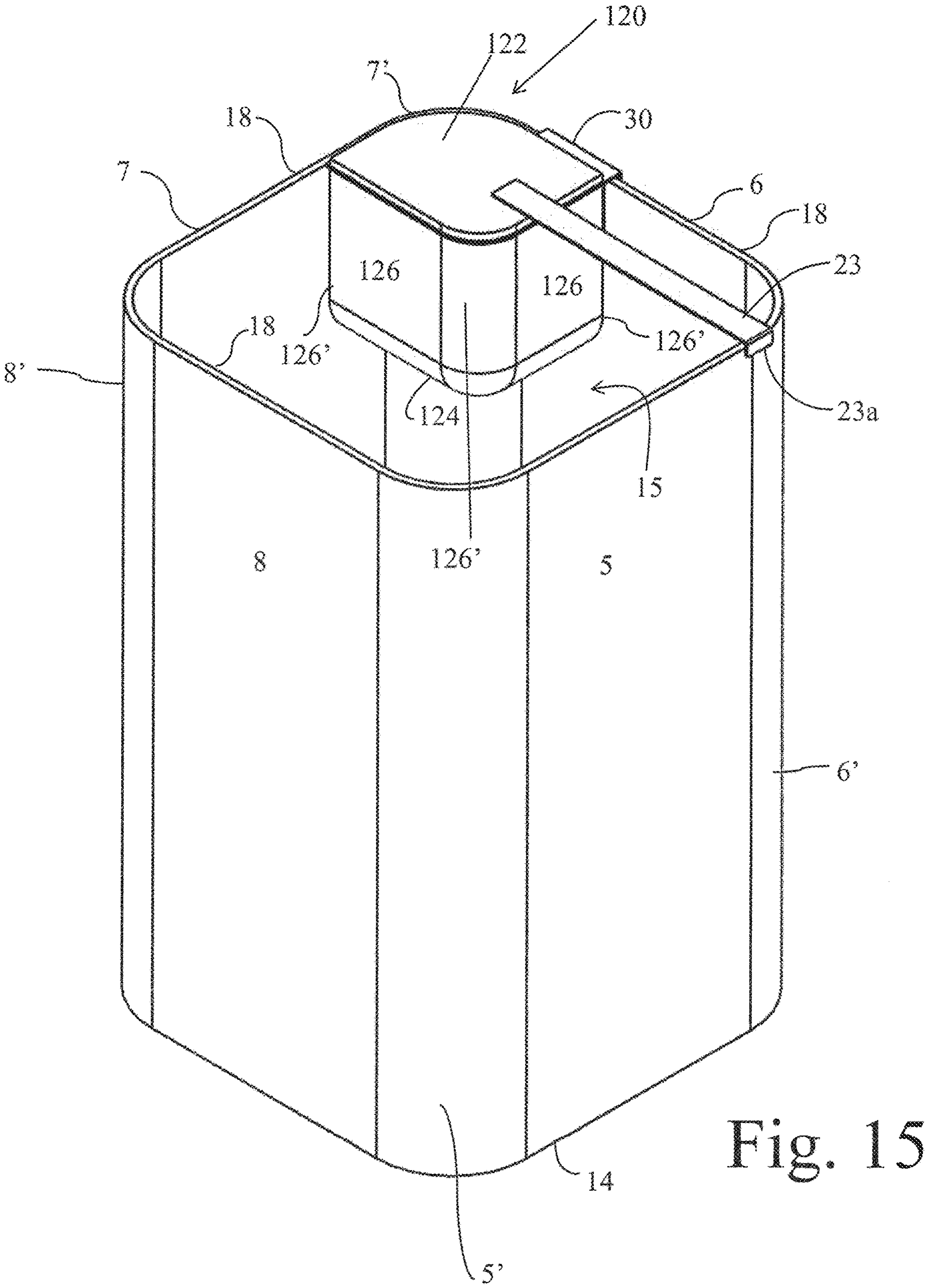
FIG. 15 is a perspective view of the waste management system of FIG. 14.

In some embodiments, like those shown in FIGS. 14 and 15, the primary receptacle 10 may include sidewall contour portions 5', 6', 7', 8' to facilitate removal of waste within the interior portion 15. As depicted, secondary receptacle 120 is of a substantially rectangular configuration having bottom 124 with sidewalls 126 having contoured edges 126' and hinged lid 122. Advantageously, the secondary receptacle 120 having contoured edges 126' may be placed at the contoured corner portions 5', 6', 7', 8' between one or more sidewalls 5, 6, 7, 8 to facilitate ease of placement of waste within the interior portion 15 of primary receptacle 10. While the secondary receptacle bottom depicted has contoured edges and a flat bottom, it should be understood by those skilled in the art that other similar geometric configurations are not meant to be precluded.

In one or more embodiments, the secondary receptacle 20 may include a receptacle liner portion 40, like those depicted in FIGS. 4, 7, and 12-13. Receptacle liner portion 40 includes container base 44 having vertically extending sidewalls 46 forming container interior 45. Liner portion 40 may be designed for placement within the secondary receptacle 20, and thus may be of a complementary structure thereof. Liner portion 40 may be constructed of any soil resistant material such as silicone, or polymer plastic, to produce a reusable and durable liner portion. To secure liner portion 40 within the secondary receptacle interior 25, the liner portion may include an attachment structure 41, which may comprise one or more magnets, tabs, slots, openings, or grooves on sidewall portions 46. As shown in the exemplary views of FIGS. 4, 7, and 12-13, the liner portion sidewalls 46 may include slots as attachment structure 41, which are received by rotatable projecting tabs 27*a* extending from projecting stem 27*b* of the secondary receptacle 20. After receiving the projecting tabs 27*a* within the attachment structure 41, an end user may rotate the tabs 27*a*, forming a detent mechanism to hold the liner portion 40 within the secondary receptacle 20 when the waste management system 1 is inverted. Advantageously, liner portion 40 may include a flanged seal or gasket around the rim 48 to facilitate further sealing between the secondary receptacle interior and liner portion interior, preventing fouling of the secondary receptacle as well as the prevention of odors emitting from the secondary receptacle when the secondary lid is closed. Due to the construction of the liner portion, a user may remove and clean the liner portion after becoming fouled with odorous waste, including pet feces, simply by releasing detent mechanism achieved by the attachment structure 41. Thus, the liner portion may be removed from the waste management receptacle system 1 without the need to remove clamping member 30 from the primary receptacle 10.

Thus, the present invention provides one or more of the following advantages: (1) a waste management receptacle system with separate compartments for the containment of foul or odorous waste; (2) an auxiliary waste receptacle system for use with an existing waste receptacle for the containment of foul or odorous waste; (3) a separate waste receptacle in a waste receptacle system to control particularly noxious odors within a separate compartment; and (4) a removable waste receptacle system which would prevent squishing or sticking of odorous organic waste to a waste receptacle system.

While the present invention has been particularly described, in conjunction with one or more specific embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A waste management receptacle system for containment of odorous waste comprising:

a primary receptacle comprising a base with vertically extending sidewalls forming an interior portion, a rim, and a primary receptacle lid proximate said rim and movable between an open position and a closed position;

a secondary receptacle comprising a bottom with upstanding sidewalls forming a secondary interior, a rim, and a lid portion moveable between an open position and a closed position, said secondary receptacle adapted for receiving and isolating odorous waste from said primary receptacle; and a clamping member comprising a lateral member having ends with first and second longitudinal members extending therefrom, a clamping channel formed between said longitudinal members, and at least one fastening member disposed on the first or second longitudinal members, said at least one fastening member movable between a disengaged position and an engaged position, said second or first longitudinal member coupled to said secondary receptacle proximate the secondary receptacle rim;

wherein said clamping member is securable to at least one of the vertically extending sidewalls of the primary receptacle upon insertion of the at least one of the vertically extending sidewalls of the primary receptacle within the clamping channel and placement of the at least one fastening member into the engaged position; and wherein said primary receptacle lid and said secondary receptacle lid portion are movable independently or in tandem between said open and closed positions to permit waste to be deposited within said primary receptacle interior portion, said secondary interior, or both.

2. The waste management receptacle system of claim 1, wherein said secondary receptacle comprises a sloped bottom to facilitate release of waste within the primary receptacle interior portion upon inversion of the waste management receptacle system.

3. The waste management receptacle system of claim 1, wherein the at least one of the vertically extending sidewalls of the primary receptacle comprises at least one stanchion member for receiving said at least one fastening member in the engaged position.

4. The waste management receptacle system of claim 1, wherein the secondary receptacle further comprises a removable receptacle liner portion for placement within the secondary interior, said removable receptacle liner portion comprising a container base having vertically extending sidewalls forming a container interior for deposit of waste therein.

5. The waste management receptacle system of claim 4, wherein the removable receptacle liner portion sidewalls comprise a plurality of openings and wherein the secondary receptacle sidewalls comprise a plurality of projecting tabs receivable with the plurality of openings to form a detent mechanism.

6. The waste management receptacle system of claim 4, wherein the removable receptacle liner portion further comprises a rim having a flanged seal or gasket to facilitate sealing of the secondary interior and container interior when the secondary receptacle lid portion is in the closed position.

7. The waste management receptacle system of claim 1, wherein the secondary receptacle lid portion comprises a moveable extension portion having a closure end, wherein said extension portion closure end is disposed on an exterior of the primary receptacle when the primary receptacle lid and the secondary receptacle lid portion are in the closed position, and wherein the extension portion is in mechanical communication with the primary receptacle lid and the secondary receptacle lid portion such that responsive to movement of the extension portion, the primary receptacle lid and the secondary receptacle lid portion may be moved in tandem from the closed position to the open position.

8. The waste management receptacle system of claim 7, wherein the extension portion closure end further comprises a magnetic or mechanical latch mechanism.

9. A waste receptacle for use with a waste management system for containment of odorous waste, said waste receptacle comprising:

a waste receptacle housing comprising a bottom with upstanding sidewalls forming a waste receptacle interior and a rim;

a removable receptacle liner adapted for placement within the waste receptacle interior, said removable receptacle liner comprising a container base having vertically extending sidewalls forming a container interior for deposit of odorous waste therein, and a rim having a flanged seal or gasket to facilitate sealing of the waste receptacle interior and container interior when a lid portion of the waste receptacle is in a closed position; and a clamping member comprising a lateral member having ends with first and second longitudinal members extending therefrom, a clamping channel formed between said longitudinal members, and at least one fastening member disposed on the first or second longitudinal members, said at least one fastening member movable between a disengaged position and an engaged position, said second or first longitudinal member coupled to the waste receptacle housing proximate the rim;

wherein said clamping member is securable to a sidewall of a primary waste management system receptacle upon insertion of the sidewall of the primary waste management system receptacle within the clamping channel and placement of the at least one fastening member into the engaged position, and wherein said waste receptacle interior is adapted for receiving and isolating odorous waste from said primary waste management system receptacle.

10. The waste receptacle of claim 9, wherein the waste receptacle further comprises a lid portion moveable between an open position and a closed position.

11. The waste receptacle of claim 10, wherein the lid portion comprises a moveable extension portion adapted for mechanical communication with a lid of the primary waste management system receptacle, such that responsive to movement of the moveable extension portion, the waste receptacle lid portion and the primary waste management system receptacle lid may be moved in tandem from the closed position to the open position.

12. The waste receptacle system of claim 11, wherein the extension portion includes a closure end comprising a magnetic or mechanical latch mechanism.

13. The waste receptacle of claim 9, wherein said waste receptacle housing comprises a sloped bottom.

14. The waste receptacle of claim 9, wherein the removable receptacle liner sidewalls comprise a plurality of openings and wherein the waste receptacle housing sidewalls comprise a plurality of projecting tabs receivable with the plurality of openings to form a detent mechanism.

* * * * *